United States Patent
Berger et al.

(10) Patent No.: US 7,644,986 B2
(45) Date of Patent: Jan. 12, 2010

(54) CHILD RESTRAINT DEVICE WITH ENERGY ABSORBING REGIONS

(75) Inventors: Russell Berger, Needham, MA (US); David Clement, Colorado Springs, CO (US)

(73) Assignee: SKJP Holdings, LLC, Naples, FL (US)

( * ) Notice: Subject to any disclaimer, the term of this patent is extended or adjusted under 35 U.S.C. 154(b) by 106 days.

(21) Appl. No.: 11/677,734

(22) Filed: Feb. 22, 2007

(65) Prior Publication Data

US 2007/0210639 A1    Sep. 13, 2007

Related U.S. Application Data

(60) Provisional application No. 60/743,447, filed on Mar. 9, 2006.

(51) Int. Cl.
*B60R 21/00* (2006.01)
(52) U.S. Cl. .................. 297/216.11; 297/484
(58) Field of Classification Search ............ 297/216.11, 297/484
See application file for complete search history.

(56) References Cited

U.S. PATENT DOCUMENTS

| | | | |
|---|---|---|---|
| 5,598,900 A | 2/1997 | O'Rourke | |
| 6,085,802 A | 7/2000 | Silberberg | |
| 6,390,234 B1 | 5/2002 | Boyer | |
| 6,419,263 B1 | 7/2002 | Busgen et al. | |
| 6,457,774 B2 * | 10/2002 | Baloga | 297/484 X |
| 6,471,298 B2 * | 10/2002 | Carine et al. | 297/484 X |
| 6,533,066 B1 | 3/2003 | O'Dell | |
| 6,564,754 B1 | 5/2003 | Cohen | |
| 7,163,081 B2 | 1/2007 | Muhich | |
| 7,350,862 B2 * | 4/2008 | Fransen et al. | 297/216.11 |
| 2005/0189169 A1 | 9/2005 | Tanaka et al. | |
| 2006/0027277 A1 | 2/2006 | Jennings et al. | |
| 2006/0048723 A1 | 3/2006 | Rohlf et al. | |

(Continued)

FOREIGN PATENT DOCUMENTS

DE    299919016    12/1999

(Continued)

OTHER PUBLICATIONS

Safety harness shock absorbing lanyards and fall arrest working at height safety harness, "www.safetysupplies.co.uk/trolleyed/21/index.htm".

(Continued)

*Primary Examiner*—Anthony D Barfield
(74) *Attorney, Agent, or Firm*—Barlow, Josephs & Holmes, Ltd.

(57) ABSTRACT

Energy absorbing webbing is provided for use in child safety seat and child restraint devices. A harness system includes energy-absorbing regions into the construction of the harness to allow some release or extension of the harness during use. The energy-absorbing regions of the harness are formed using energy-absorbing webbing in a given region or regions to permit the webbing to extend or elongate so that strong forces are not fully and directly imparted to the child. The energy-absorbing region may be installed at various positions within the child safety seat and harness system and may be incorporated into the child safety harness as original equipment or as a retrofit feature.

3 Claims, 12 Drawing Sheets

U.S. PATENT DOCUMENTS

2006/0071535 A1 4/2006 Kim et al.
2006/0266581 A1 11/2006 Tanaka et al.

FOREIGN PATENT DOCUMENTS

| DE | 10329470 A1 | 1/2005 |
| FR | 2760648 A1 | 9/1998 |
| JP | 10033703 | 2/1998 |
| JP | 11104257 | 4/1999 |
| JP | 2005261409 | 9/2005 |

OTHER PUBLICATIONS

Textile World, "Textiles in Automotive Engineering:, www.textileworld.com/Products.htm?ID=337".

MSA Fall Protection 15, "ArcSafe Fall Protection Products", "www.westrnsafety.com/msaroseproducts/msafallprotec15.html".

* cited by examiner

CHILD RESTRAINT DEVICE WITH ENERGY ABSORBING REGIONS

CROSS-REFERENCE TO RELATED APPLICATIONS

This application is related to and claims priority from earlier filed U.S. Provisional Patent Application No. 60/743,447, filed Mar. 9, 2006, the contents of which are incorporated herein by reference.

BACKGROUND OF THE INVENTION

The present invention relates generally to child safety and restraint devices. More specifically, the present invention relates to child safety seats and the harness systems that are employed therewith.

In the prior art, child safety seats are very well known and documented. Generally, as depicted in FIGS. 1-4, child safety seats 2 are constructed to include a rigid shell 4 that is secured to an existing vehicle seat 6 using an arrangement of straps and/or belts that firmly retain the child safety seat 2 in the installed position. When installing older child style safety seats into a vehicle, the rigid shell 4 of child safety seat 2 included a passageway through which the vehicle seat belt was passed and then buckled. In this arrangement the vehicle seatbelt served as the means by which the child safety seat was retained in its installed position in the vehicle. Newer child safety seats for installation into late model cars, which include the federally mandated LATCH system, employ a lower strap 8 that attaches the rigid shell 4 of the child safety seat 2 to rigid attachment points provided within the vehicle seat 6 itself. In addition, most newer child safety seats 2 include a tether 10 that extends from the upper portion of the back of the safety seat 2 to another rigid attachment point 12 in the vehicle either on the rear of the vehicle seat back or on the rear deck behind the vehicle seat. By attaching the child safety seat 2 to the vehicle in this manner, a rigid platform is established within the vehicle to safely restrain the child for transport.

Figure 1:
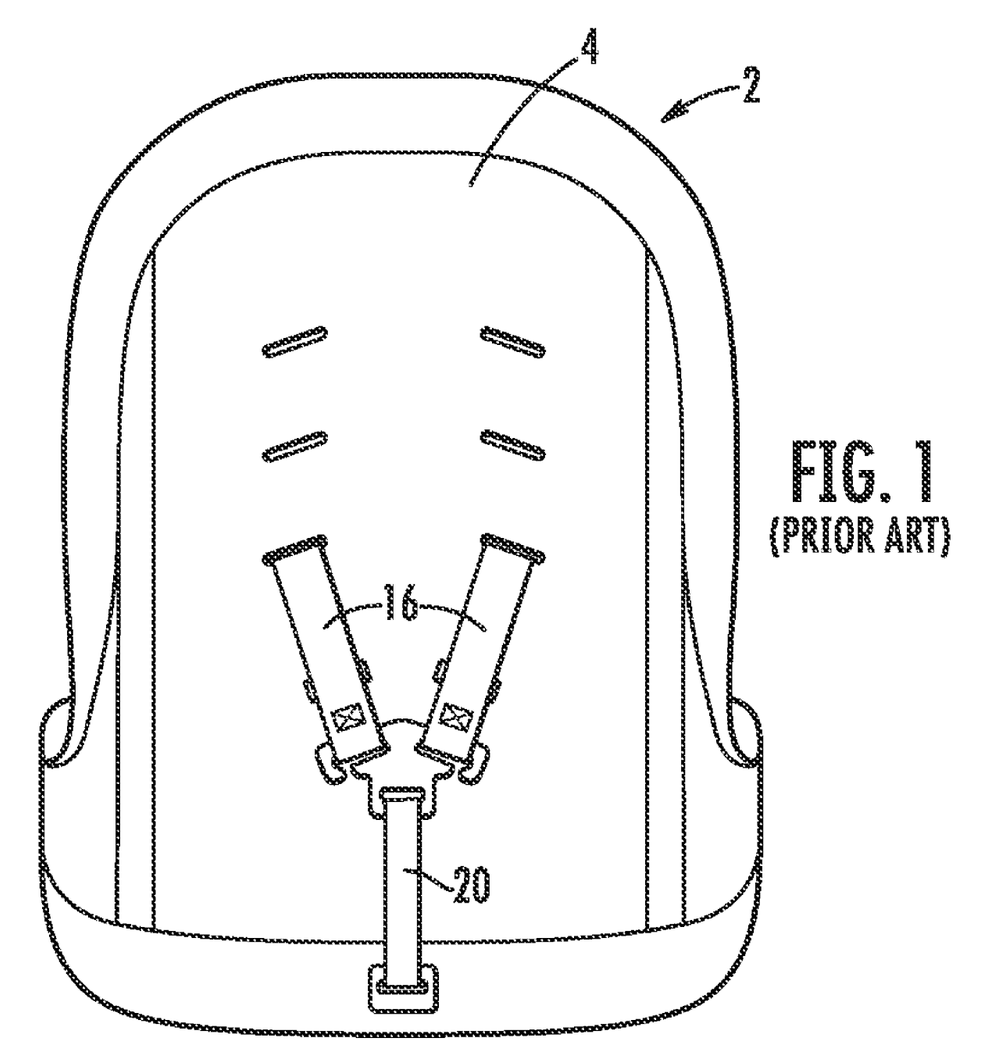
FIG. 1 is a rear view of a prior art child safety seat depicting a typical harness configuration installed therein.
Figure 2:
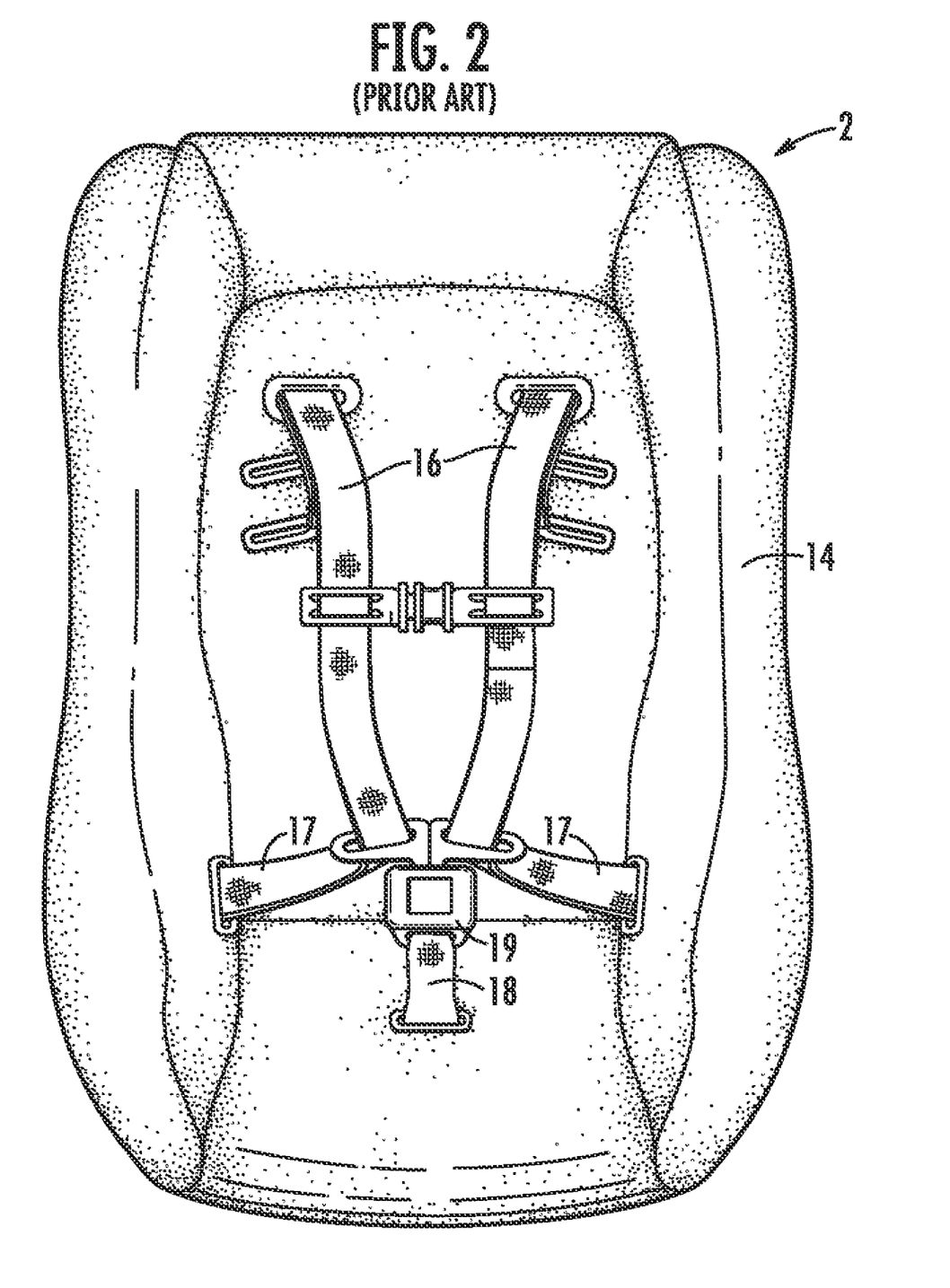
FIG. 2 is a front view of a prior art child safety seat depicting a typical harness configuration installed therein.
Figure 3:
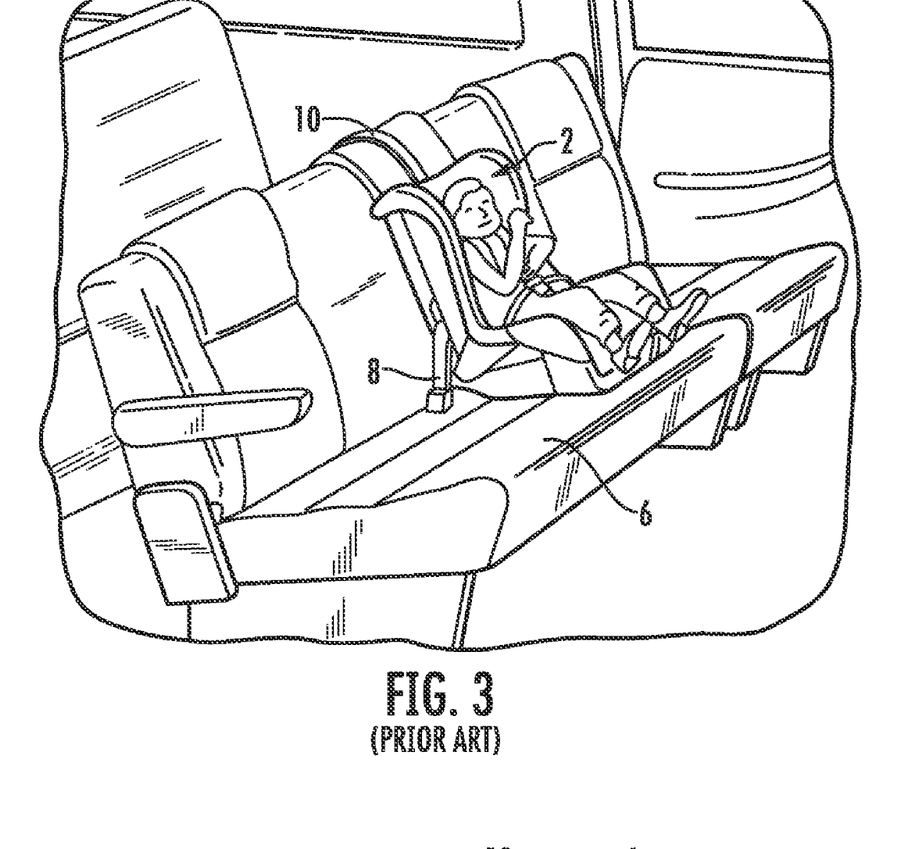
FIG. 3 is a prior art illustration of a child safety seat affixed to a vehicle seat using a LATCH type arrangement.
Figure 4:
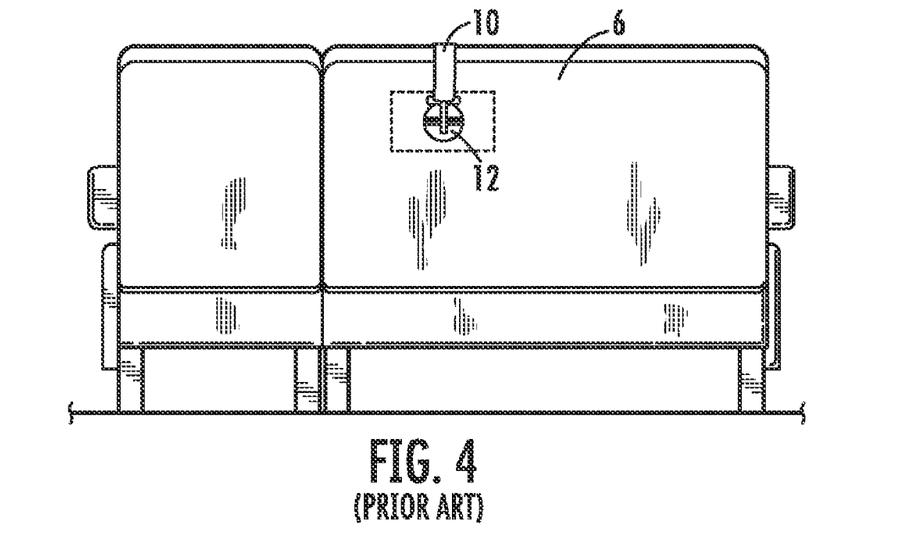
FIG. 4 is a prior art illustration of the rear of a vehicle seat depicting a top tether attached to an attachment point provided on the rear thereof.

The rigid shell 4 of the child safety seat 2, in addition to having padding 14 to make the seat comfortable for the child seated therein, also includes a harness that is used to secure the child within the child seat in order to restrain the child during travel and protect them in the event of an accident. It is this child restraint harness that creates a particular concern when trying to safely retain the child within the safety seat itself during use. Typically, these harness systems use belt-like webbing material in order to secure the child in similar fashion to a seat belt. The harness typically employs two webbing belts 16 that pass on either side of the child's neck and over their shoulders. The opposite ends of the webbing belts 16 are then removably secured to a lap belt 18 via a buckle 19 in front of the child. At the shoulders, the two belts 16 are routed through the seatback and secured to a single belt 20 that is located behind the seat and in turn extends beneath the seat to a location that allows the tension of the harness system to be adjusted by the parent. As the webbing straps pass the buckle 19 the turn along the lap of the child and form a lap restraint 17 in front of the child's hips and terminate in attachment points at the sides of the child safety seat 2.

There is a well-known problem associated with these existing child restraint harness systems in that the belts are substantially inelastic, in other words they do not stretch or give in any way. Since they are similar to seat belt webbing in their manufacture, they tend to be quite rigid and inflexible. The concern is that while for safety purposes this belt webbing does not stretch much at all, even during an accident where substantial impact forces may be imparted to the seat, the rigidity of the child restraint harness itself causes those impact forces to be transferred to the child restrained therein. It has been found that when these forces are applied to a child safety seat that employs a prior art rigid webbing restraint the harness, the child restrained therein can suffer injury. For example, the child's shoulders may receive a significant impact during an accident that may result in severe bruising and even bone injury.

In view of the foregoing, there is a need for a child safety seat that employs a harness system that safely and effectively restrains the child seated therein, yet includes sufficient energy-absorbing characteristics to prevent the transfer of shock loads to the child's body. There is a further need for a harness system for use in a child safety seat that has webbing that permits some elongation while still providing sufficient restraint to insure the safety of the child restrained therein during an accident. There is a further need for an improved harness system for use in connection with a child safety seat that does not affect the operation of the normal of the child seat or compromise the overall safety thereof. Finally, there is a need for a device that can be installed into an existing child safety seat harness system thereby creating some elasticity while still providing sufficient restraint to insure the safety of the child restrained therein during an accident.

SUMMARY OF THE INVENTION

In this regard, the present invention is generally directed to a novel and unique harness system for use in a child safety seat. The harness system is configured to include new and unique energy-absorbing regions into the construction of the harness itself thereby permitting some release or extension of the harness during use. The energy-absorbing regions of the harness of the present invention are provided in the form of energy-absorbing webbing that is included in a given region or regions, as will be discussed in detail below, to permit the webbing to extend or elongate so that strong forces are not fully and directly imparted to the child, particularly their shoulders and neck region. As a result, the present invention preserves the advantages of prior art child safety seats and harness systems while providing provides new advantages not found in currently available devices.

The harness system of present invention provides for a number of different embodiments that provide for installation at various positions within the child safety seat and harness system, as will be discussed in detail below. In each of the embodiments, the general inventive concept provides for a webbing structure, which is enlogatable and thereby energy absorbing, to be incorporated into the child safety harness as original equipment or as a retrofit feature. The inclusion of the elongatable webbing structure acts as an energy-absorbing region within the harness so that when sudden forces are applied to the vehicle in which the child safety seat is mounted, the impacts or tension that would typically be transferred to the child restrained within the harness are absorbed or cushioned by the harness.

In a first embodiment, the elongatable webbing structure is installed inline in the harness system during manufacture of the child safety seat behind the seatback at the point just below the splitter plate where the two shoulder belts are joined together. In a second embodiment, the elongatable webbing structure includes a loop at one end thereof to engage the splitter plate on the end of the single harness adjustment strap while the opposite end of the elongatable webbing structure includes a second splitter plate that receives and retains the two ends of the shoulder belts. In a third embodiment, two sections of the elongatable webbing structure are installed into each of the shoulder belts either in front of or behind the seat back. In a forth embodiment, the elongatable webbing structure is provided in the lap belt section between the seat bottom and the buckle that receives the shoulder straps. In a fifth embodiment the elongatable webbing structure is provided in the LATCH strap that attaches the child safety seat to the vehicle. In a sixth embodiment, the elongatable webbing structure is provided in the tether that serves to affix to the upper portion of the child safety seat back to the vehicle. In a seventh embodiment, the energy absorbing region is in the form of a stretchable material such as rubber, bent metal clips, partially oriented yarn materials both with and without strength fibers included therein and combinations thereof.

Accordingly, it is an object of the present invention to provide a harness system for use in connection with a child safety seat that safely and effectively restrains the child seated therein, yet includes sufficient energy-absorbing characteristics to prevent the transfer of shock loads to the child's body. It is a further object of the present invention to provide a harness system for use in a child safety seat that has at least one section of webbing that includes some elasticity, while still providing sufficient restraint to insure the safety of the child restrained therein during an accident. It is still a further object of the present invention to provide a device that can be installed into an existing child safety seat harness system thereby creating some elasticity while still providing sufficient restraint to insure the safety of the child restrained therein during an accident.

These together with other objects of the invention, along with various features of novelty, which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 5:
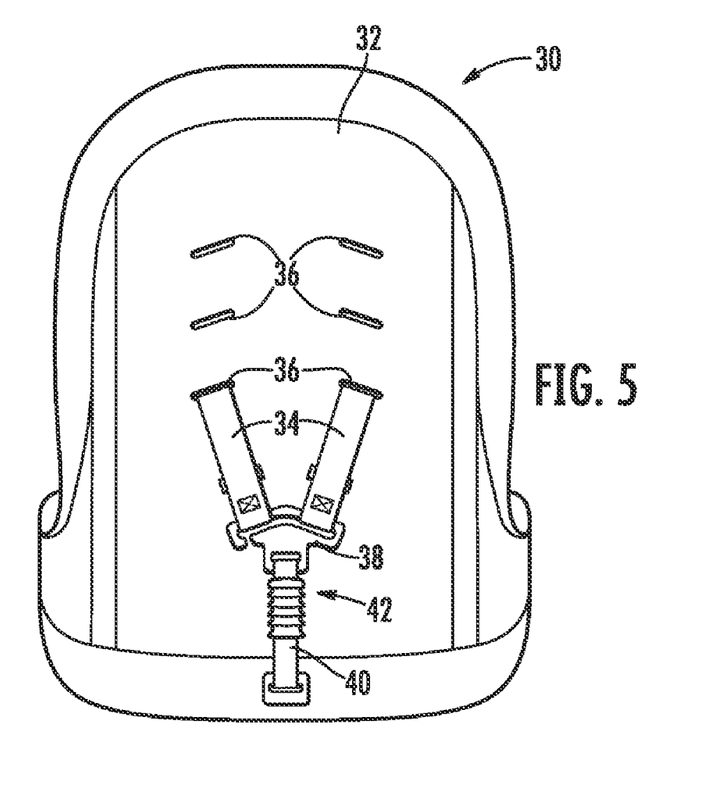
FIG. 5 is a rear view of a child safety seat depicting a harness that includes an elongatable webbing structure therein in accordance with a first embodiment of the present invention.
Figure 6:
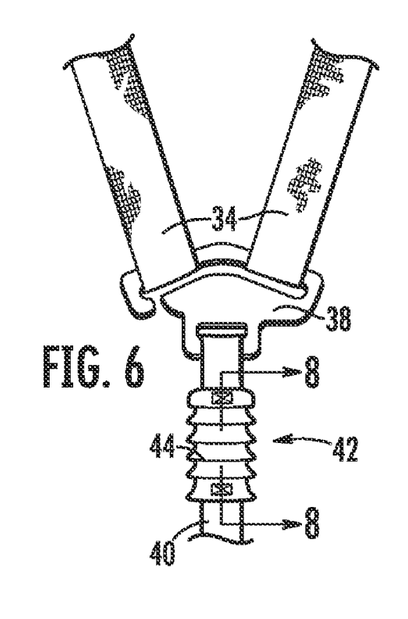
FIG. 6 is a detail view of the harness in FIG. 5 with the elongatable webbing structure in a relaxed, unloaded state.
Figure 7:
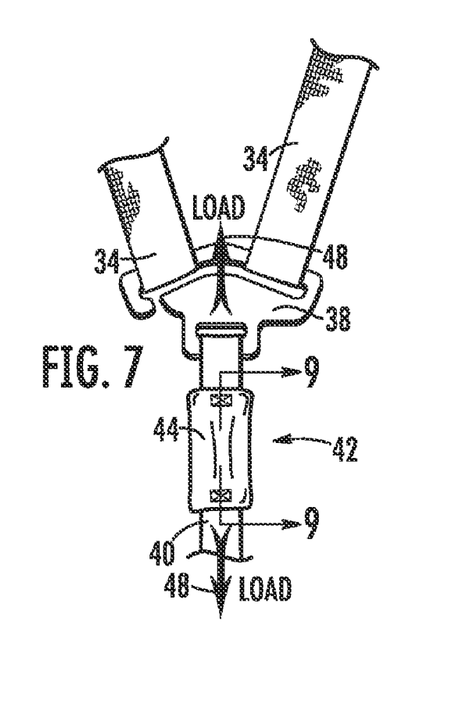
FIG. 7 is a detail view of the harness in FIG. 5 with the elongatable webbing structure in an extended, loaded state.

Now referring to the drawings, the general features and points of novelty for a harness system for a child safety seat as taught by the present invention are illustrated in FIGS. 5-7. The harness system of the present invention is configured to be installed into a child safety much in the same manner as was done in the prior art, but includes energy-absorbing regions that are integrated into the construction of the harness itself. The incorporation of these energy-absorbing regions permits some release or extension of the harness during use and in particular when sudden forces are applied thereto.

As can be seen in FIG. 5, the child safety seat 30, as was also the case in the prior art, has a rigid shell 32 that serves as the primary structure of the child safety seat 30. Two harness straps 34 that serve as shoulder restraints for the child pass through openings 36 in the seat back portion of the rigid shell 32 to the rear of the child safety seat 30. The terminal ends of the two harness straps 34 are affixed to a splitter plate 38 that allows the two harness straps 34 to be joined together and attached to a single strap 40 that in turn serves to affix the two harness straps 34 to the child safety seat and allow adjustments in the length of the harness system. The energy-absorbing region 42 in this particular embodiment of the present invention can be seen to be incorporated into the single strap 40 at a location adjacent the point where the single strap 40 is attached to the splitter plate 38.

It should be appreciated by one skilled in the art that while the present invention is described as including an energy-absorbing region, this term is meant broadly and includes shock absorbing. The use of the terms "energy-absorbing" and "shock absorbing" are not intended to limit the scope of the present invention. Accordingly, where an embodiment is described as "energy-absorbing" the invention is regarded as also pertaining to "shock absorbing" and vise versa.

Figure 8:
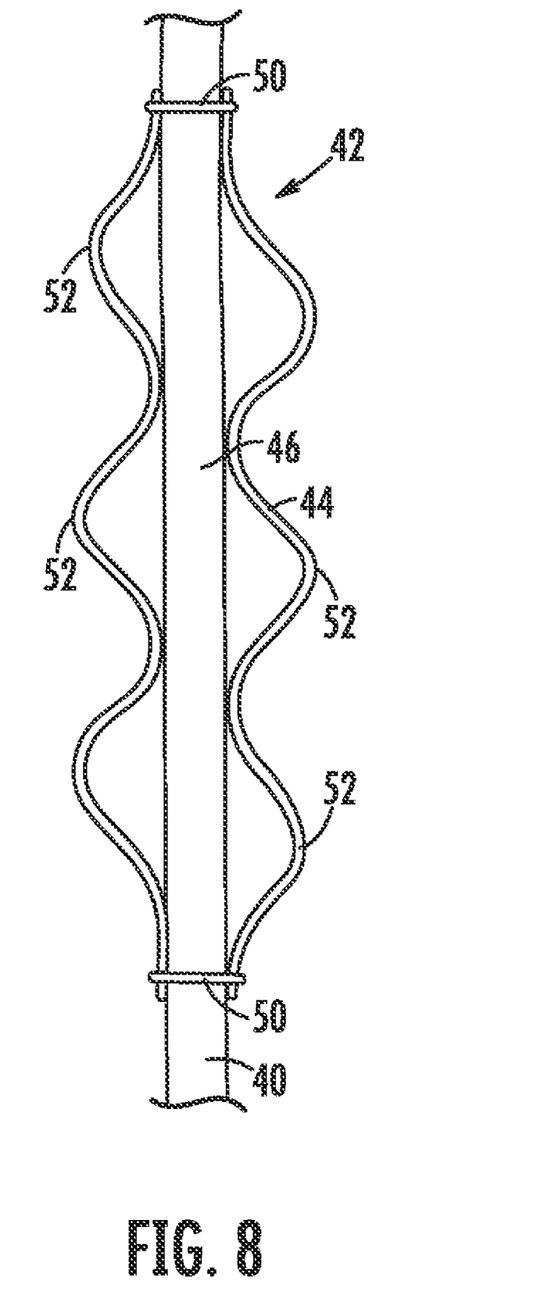
FIG. 8 is a cross-sectional view taken along line 8-8 of FIG. 6.
Figure 9:
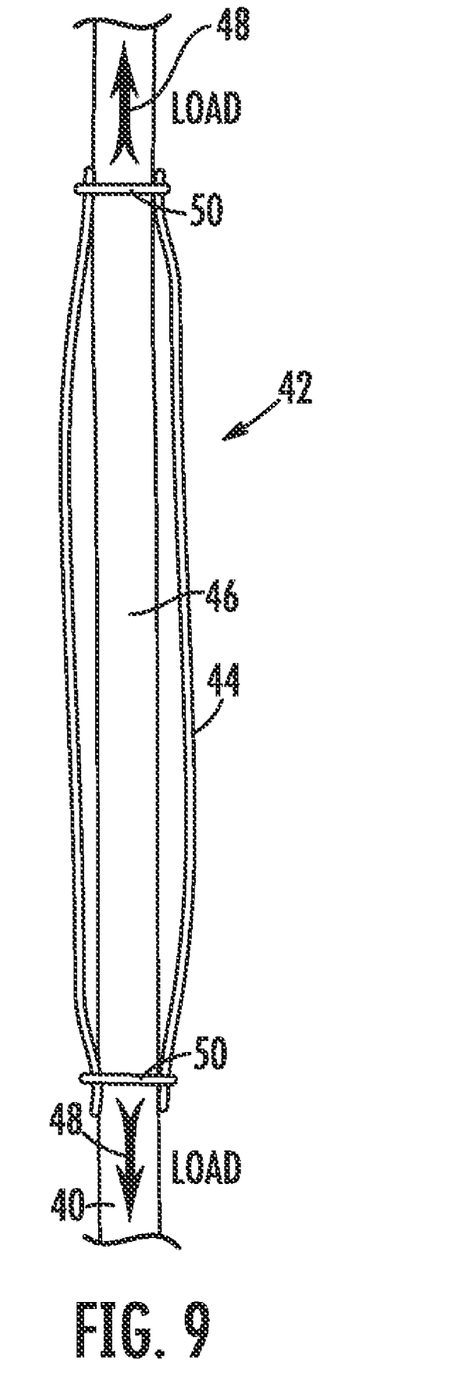
FIG. 9 is a cross-sectional view taken along line 9-9 of FIG. 7.

Turning to FIGS. 6 and 7, a detailed view of the harness system in FIG. 5 is depicted with particular attention given to the splitter plate 38 region where the two harness straps 34 are joined to the lower single strap 40. FIG. 6 depicts the harness system at rest with no loading applied thereto while FIG. 7 depicts the harness system under loading such as would occur in the event of a motor vehicle accident. In FIG. 6, the energy-absorbing region 42 can be seen to be shortened or relaxed with the outer sheath 44 gathered around the internal core webbing 46. Turning now to FIGS. 8 and 9 in connection with FIG. 7, when loading is applied, as depicted by the arrows 48 in FIG. 7, the internal core webbing 46 of the energy-absorbing region 42 stretches in turn also stretching the gathered outer sheath 44. This extension of the energy-absorbing region 42 allows the forces applied to be dissipated within the harness system thereby reducing the amount of force that is transferred to a child restrained within the harness system and child safety seat 30.

Still referring to FIGS. 8 and 9, cross sectional views of the energy-absorbing region 42 are shown both at rest and under a load condition. In considering FIGS. 8 and 9, the particulars related to the construction and operation of the energy-absorbing region 42 are depicted and described. Preferably, the energy-absorbing region 42 is formed using an internal core webbing 46 of partially oriented yarn (POY) webbing. Such POY webbing is well known in the art and is woven in a manner that allows linear extension of the webbing when a load is applied. It is also of note that such POY webbing, while having elongatable properties, also retains the strength normally associated with its rigid webbing counterparts. A sheath 44 of non-elastic material is installed over the POY webbing 46 material when the POY webbing 46 is in its unloaded, relaxed state. The sheath 44 is gathered in a pleat like fashion over the elastic portion of the POY webbing 46 and its ends are then stitched 50 through the POY webbing material 46 joining the POY webbing 46 and sheath 44 into a single operational energy-absorbing region 42. In assembling and fastening the sheath 44 to the POY webbing material 46 in this manner, the length of sheath 44 material is spring-biased to a shorter compressed length by the core POY webbing material 46 contained therein.

Turning now to FIG. 9, when a load 48 is placed on the energy-absorbing region 42, the core POY webbing 46 material contained therein stretches and in turn stretches the pleats 52 out of the gathered sheath 44. As the pleats 52 are stretched out of the sheath 44 however, the length of the non-elastic outer sheath 44 material limits the extent to which the core POY webbing 46 material can stretch. In other words, the outer sheath 44 provides a "stop" for the length to which the core POY webbing 46 material can ultimately be stretched. This allows for the energy absorbing region 42 to extend by a predetermined length to absorb shock energy applied thereto yet limit the overall extension of the energy-absorbing region 42 and therefore the tension of the entire restraint harness so that the restraint harness still effectively restrains the child seated in the child safety seat 30. In operation therefore, it can be seen that the energy-absorbing region 42 allows impact or shock forces to be dissipated through a stretching or elongation of the energy-absorbing region 42 while still effectively retaining the child in a safely seated position within the child safety seat 30. The energy-absorbing region 42 is configured to have properties that are more elastic than the standard webbing used in such restraint harnesses. In particular, it is preferred that the energy-absorbing region material will elongate more than an equal length of standard webbing material when subjected to an equal force below 2,000 lbs. It is further preferred that the energy-absorbing region will extend from an initial length to an extended length by a difference in length of approximately 0.5" when subjected to an equal force below 2,000 lbs. Finally, it is preferred that the energy absorbing region will extend by approximately 5% of it length as compared to an unloaded state.

Figure 14:
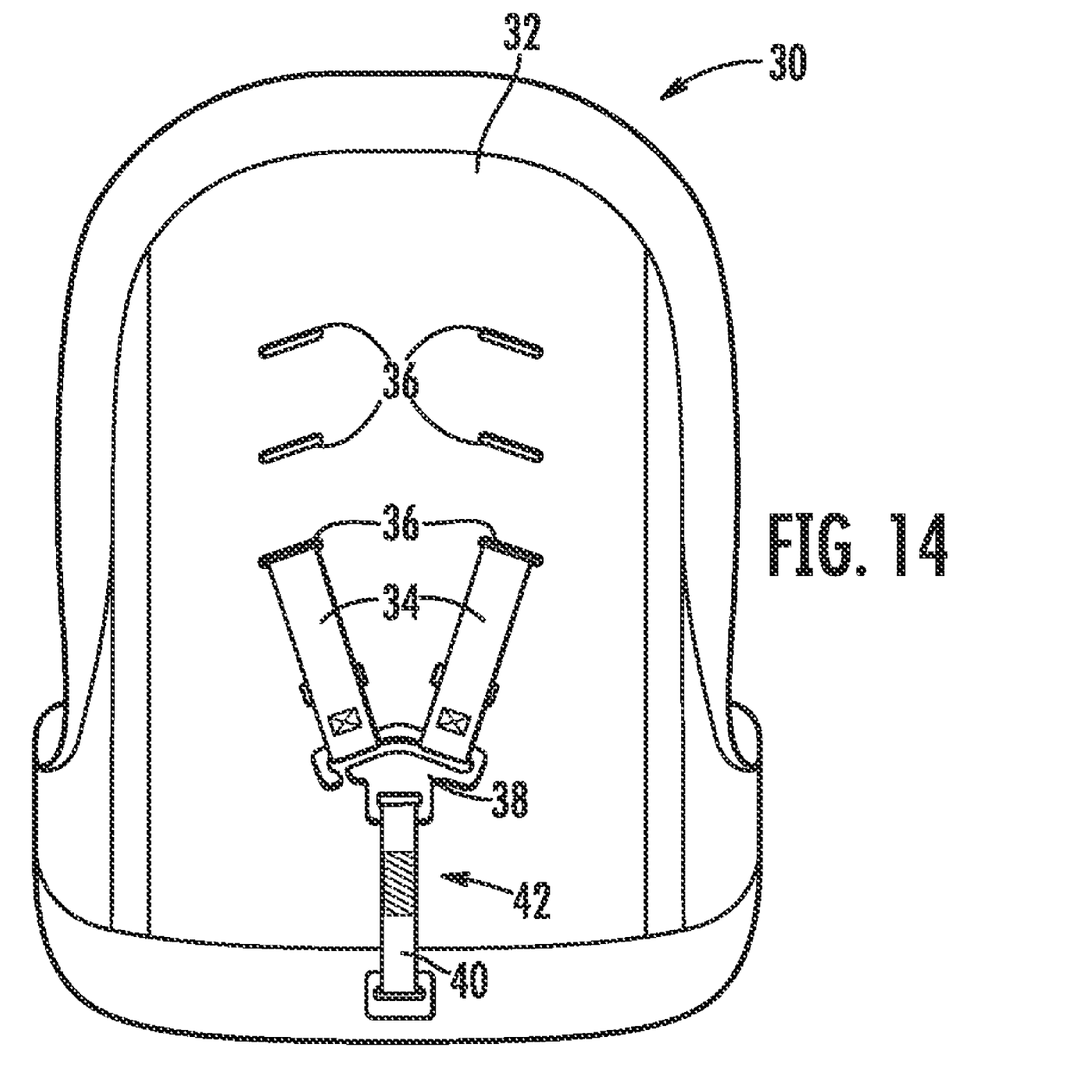
FIG. 14 is a rear view of a child safety seat depicting a harness that includes a stretchable material as an elongatable webbing structure.

It should be understood that while the use of POY webbing 46 is described, the present invention ins intended to encompass any energy-absorbing region 42 that is incorporated into a child safety seat harness system. As discussed above, while POY material particularly suitable for absorbing the energy or shock that otherwise would be transferred to the child, it is possible that other flexible materials may also be utilized to achieve the same result thereby also falling within the spirit and scope of the present invention. For example, other suitable materials for use as an energy-absorbing region 42 may include rubber, elongatable textiles and springs as generally shown in FIG. 14. In addition, it should be appreciated by one skilled in the art that the energy-absorbing region 42 may be incorporated directly into the structure of harness system during manufacture thereof, or it can be provided as a separate add-on structure that can be easily retrofitted into an existing harness system and child safety seat. Further, while an energy absorbing region 42 that returns to its original pre-loaded dimension may be preferred, the use of break-away or tear-away webbings may also be used and still fall within the scope and spirit of the present invention.

Figure 10A:
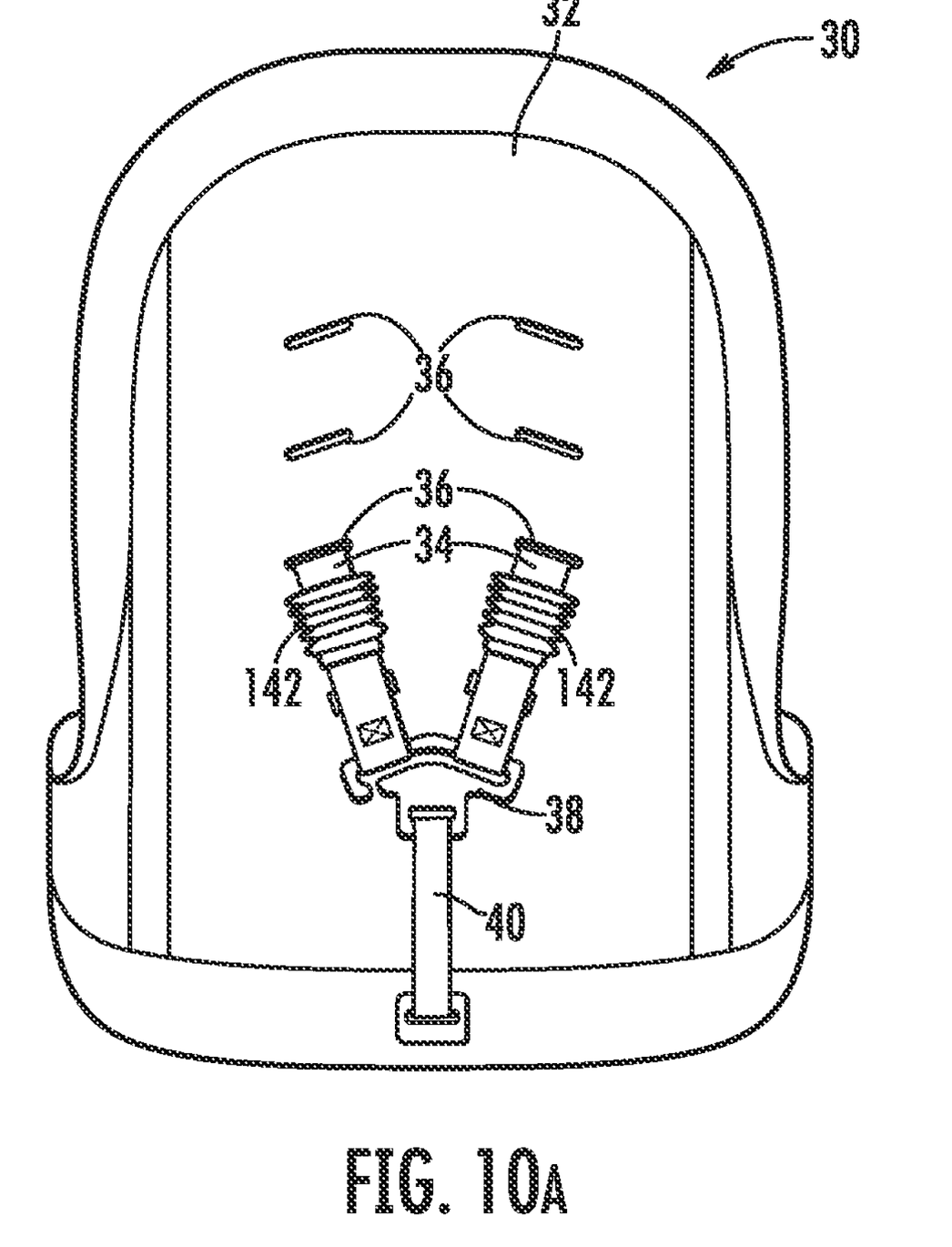
FIG. 10a is a rear view of a child safety seat depicting a harness that includes two elongatable webbing structures therein in accordance with a second embodiment of the present invention.
Figure 10B:
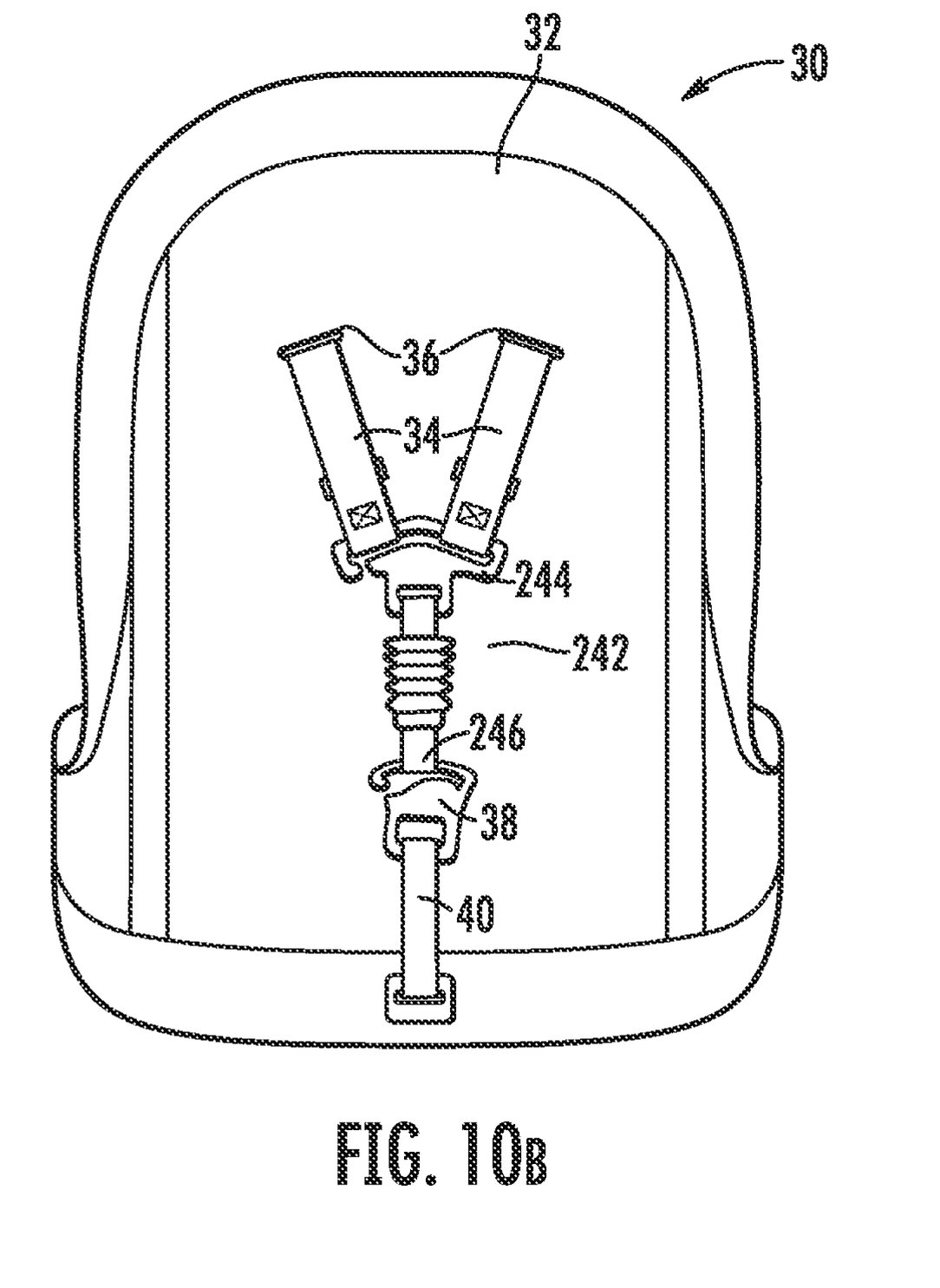
FIG. 10b is a rear view of a child safety seat depicting a harness that includes a retrofit elongatable webbing structure therein in accordance with a third embodiment of the present invention.

Turning now to FIGS. 10a and 10b two additional drawings of the rear of the child safety seat 30 are shown that depict alternate embodiments or implementations for the energy-absorbing region of the present invention. In FIG. 10a, a second embodiment is shown wherein two energy-absorbing regions 142 are shown installed into the two harness straps 34 before the harness straps 34 are attached to the splitter plate 38. In this embodiment, two energy-absorbing regions 142 are employed so that the energy absorbing effect is evenly distributed into each of the two harness straps 34. FIG. 10b shows an energy-absorbing region 242 that is configured as a retrofit type assembly. In this embodiment the energy absorbing region 242 also includes an additional splitter plate 244 at one thereof and a loop 246 at the opposite end thereof. In this manner, the lower strap 40 and splitter plate 38 can be disengaged from the ends of the two harness straps 34 and the retrofit energy absorbing region 242 can be installed between the two harness straps 34 and the lower strap 40. The splitter plate 244 on the retrofit energy absorbing region 242 is engaged with the loops on the existing harness straps 34 and the splitter plate 38 on the lower strap is engaged with the loop 246 on the retrofit energy absorbing region 242. This allows for the introduction of an energy absorbing region 242 into a child safety seat 30 that did not previously include one, thereby providing additional safety without requiring a replacement child safety seat.

Figure 11A:
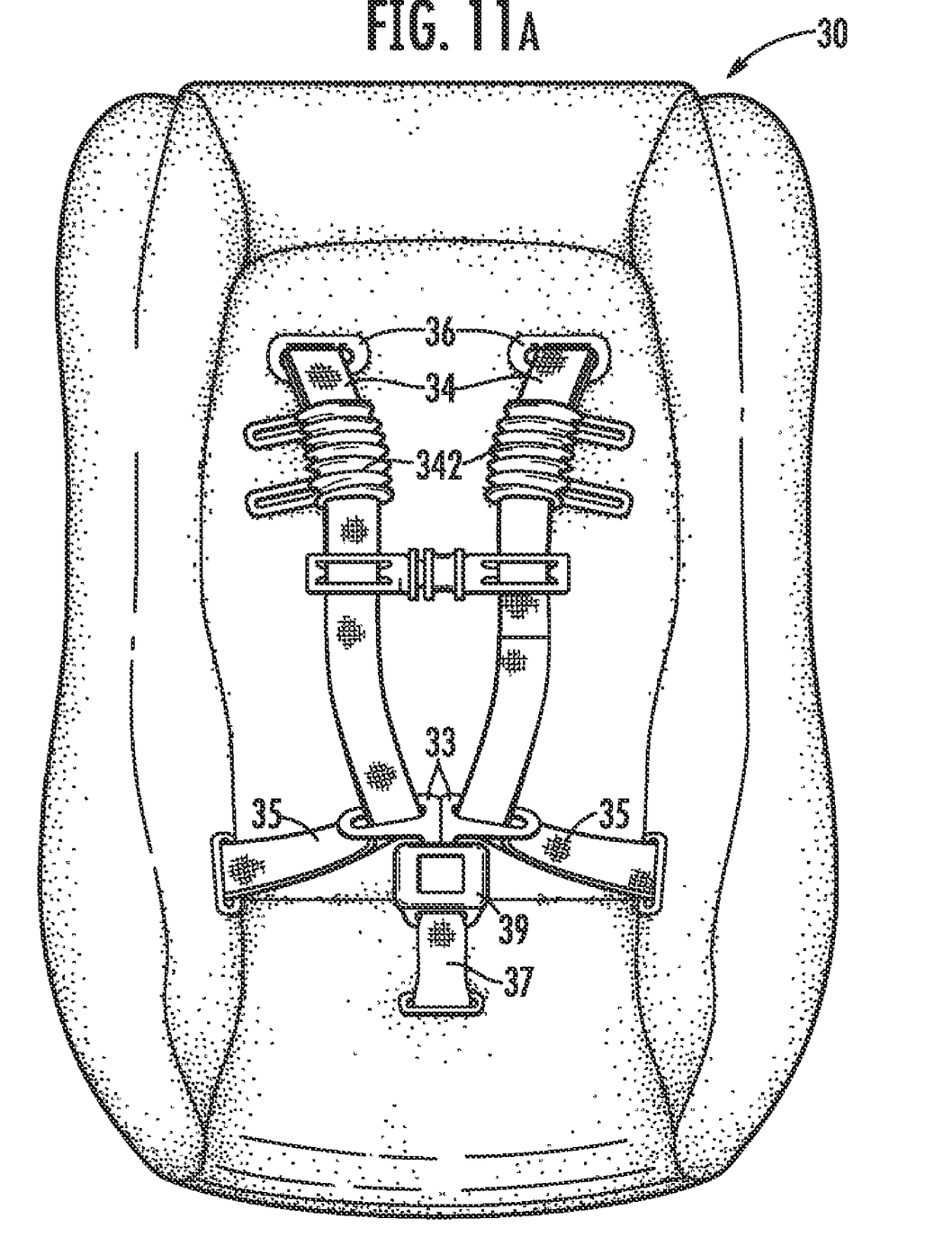
FIG. 11a is a front view of a child safety seat depicting a harness that includes two elongatable webbing structures therein in accordance with a fourth embodiment of the present invention.

FIG. 11a depicts a front view of the child safety seat 30 that includes a harness system that employs a third embodiment energy-absorbing region 342 in accordance with the teachings of the present invention. In this embodiment, the energy absorbing regions 342 are placed into the two upper harness straps 34 somewhere between the location where the harness straps 34 pass through the holes 36 in the shell 32 of the child safety seat and before the harness straps 34 pass through buckle plated 33 that serve to engage the upper harness straps 34 with the lap belt 37 and buckle 39. This positions the energy absorbing regions 342 in a location that is at or very near the shoulders and neck region of the child seated and restrained within the child safety seat 30.

Figure 11B:
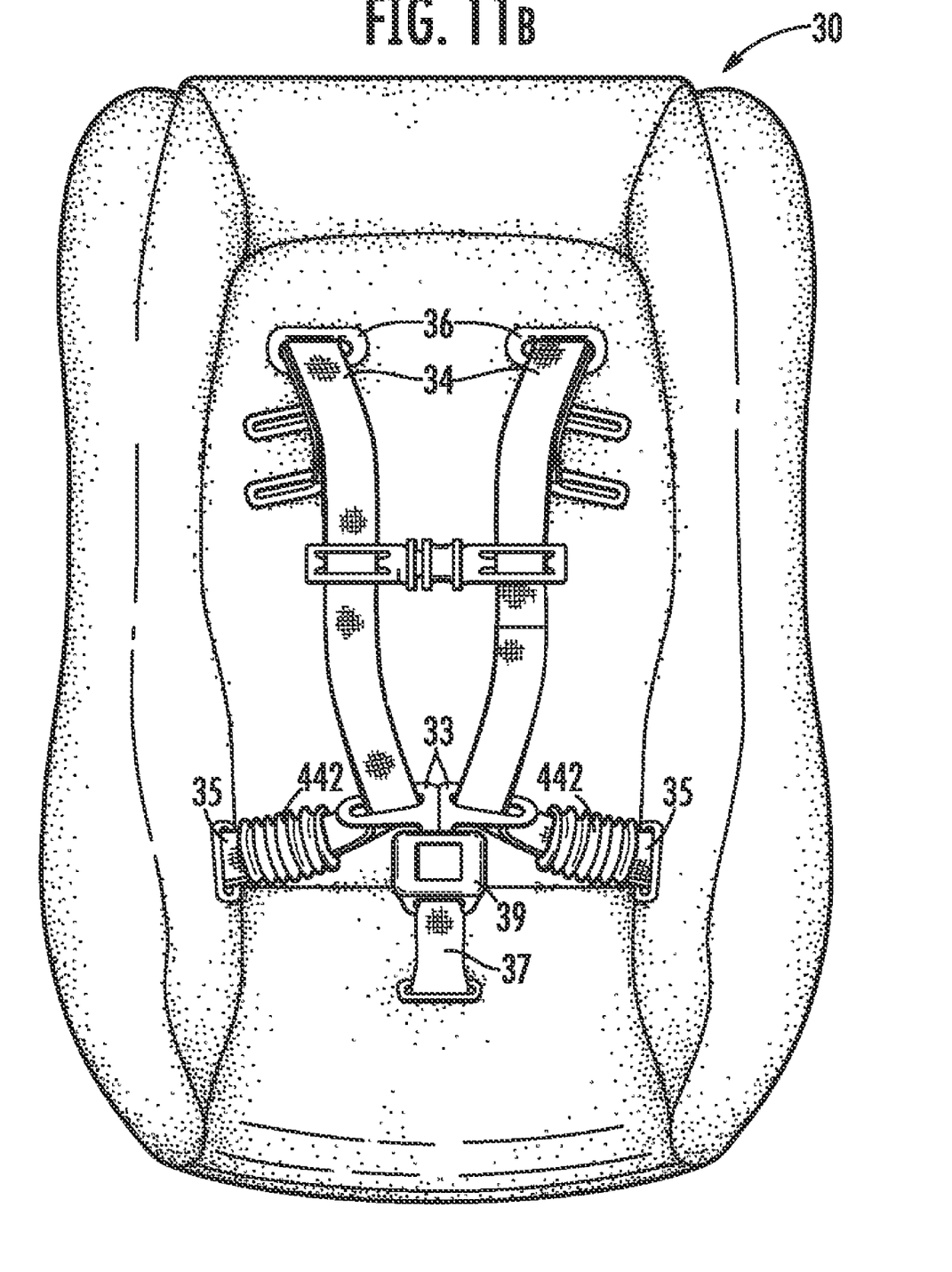
FIG. 11b is a front view of a child safety seat depicting a harness that includes two elongatable webbing structures therein in accordance with a fifth embodiment of the present invention.
Figure 11C:
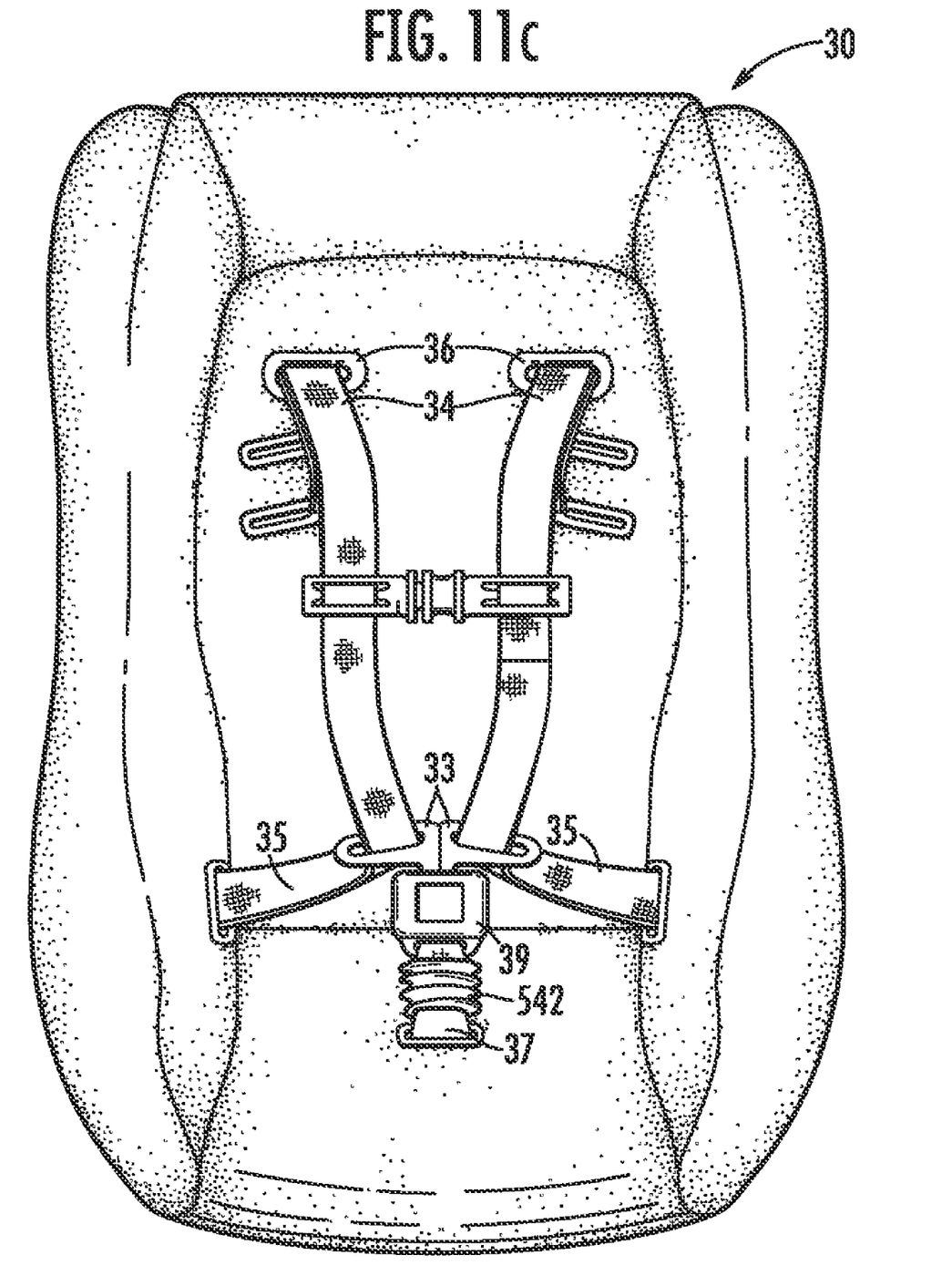
FIG. 11c is a front view of a child safety seat depicting a harness that includes an elongatable webbing structure therein in accordance with a sixth embodiment of the present invention.

Turning now to FIG. 11b, a fourth embodiment of the energy-absorbing region 442 is illustrated wherein two energy absorbing regions 442 are included in the lap restraint belts 35 between the buckle 39 and the point at which the lap restraint belts 35 engage the sides of the child safety seat 30. Similarly, FIG. 11c, illustrates a fifth embodiment energy absorbing region 542 that is installed into the lap belt 37 between the buckle 39 and the point at which the lap belt 37 attaches to the bottom of the child safety seat 30. It should be appreciated that in all of the embodiments depicted in FIGS. 10a and b and in FIGS. 11a, b and c. The intent is that an energy absorbing region be incorporated into the restraint harness system within a child safety seat 30 in order to better balance, reduce and distribute any shock forces that may be applied to the child safety seat 30 and a child restrained therein. In this regard, each one of these embodiments may be used on its own or in combination with one or more of the other embodiments depicted herein to create a harness system for a child safety seat 30 that best protects a child seated therein.

Figure 12:
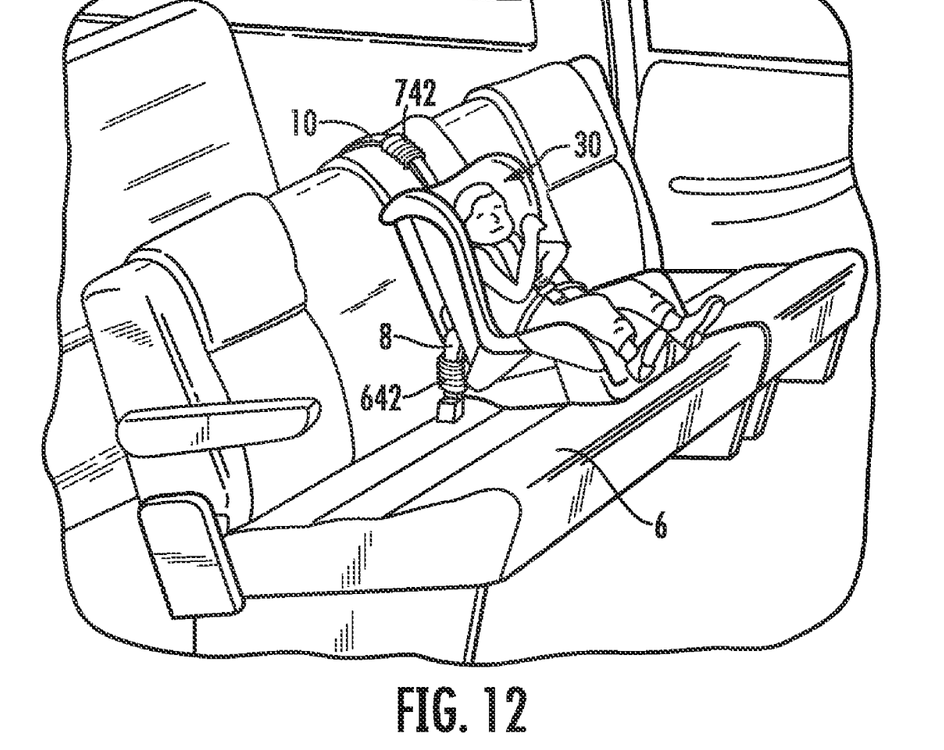
FIG. 12 is a perspective view of a child safety seat installed into a vehicle seat depicting a LATCH and tether system that includes elongatable webbing structures therein in accordance with a seventh embodiment of the present invention.
Figure 13:
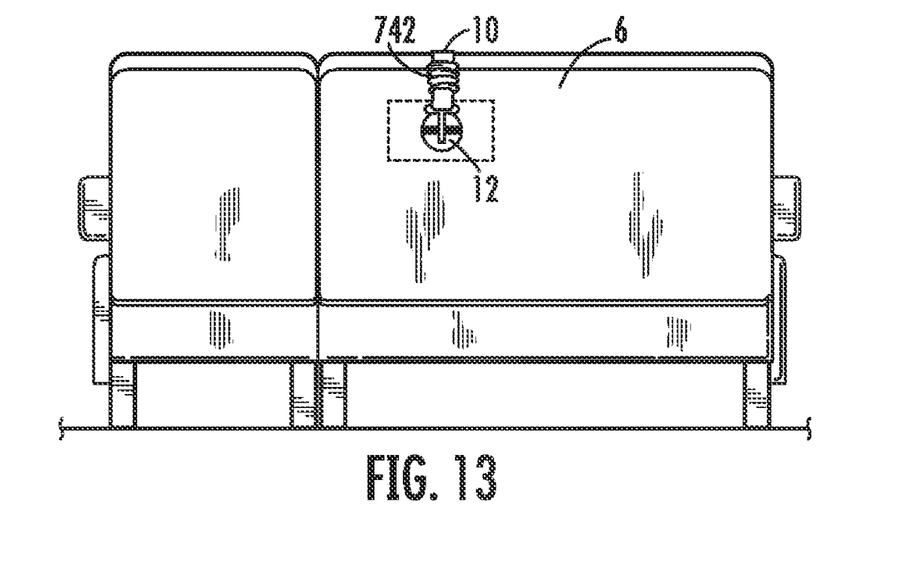
FIG. 13 is a rear view of a vehicle seat depicting a tether attachment point that includes an elongatable webbing structure therein in accordance with an eighth embodiment of the present invention.

Turning to FIGS. 12 and 13, a child safety seat 30 is shown installed into a vehicle seat 6 using a LATCH strap 8 and tether 10 system. In accordance with the teachings of the present invention, the LATCH strap 8 is formed to include an energy-absorbing region 642 that is either manufactured into the LATCH strap 8 or created as a retrofit device to be installed into the existing LATCH strap 8. In this manner, the energy-absorbing region 642 of this embodiment introduces a shock-absorbing feature at the point where the child safety seat 30 is attached to the vehicle seat 6 while also providing for secure attachment of the child safety seat 30 to the vehicle seat 6. Similarly, an energy absorbing region 742 is depicted in the tether 10 that attaches the back of the child safety seat to the back of the vehicle seat 6. This energy absorbing region 742 can be included at any point in the tether 10 as is shown by the varied location depicted in both FIGS. 12 and 13 and also may be provided as original equipment or as a retrofit device. Also as stated above, the energy absorbing regions 642 and 742 may be employed as standalone devices or in conjunction with any one or more of the embodiments also disclosed herein to create an integrated child safety seat 30 and harness restraint system that exhibits improved safety as compared to the prior art.

It can therefore be seen that the present invention provides an improved child safety seat 30 that incorporates at least one energy absorbing region into the restraint harness and/or seat attachment system in a manner that absorbs shock or impact forces applied thereto and prevents transfer of those forces to a child seated and restrained within the child safety seat. In this manner, the child seated and restrained within the child safety seat is better protected from injuries that often resulted from a transfer of impact forces through the rigid harness systems in the child safety seats of the prior art. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A restraint harness for use in a child safety seat, comprising:
   a restraint harness including:
      two shoulder harness straps extending through openings in a back of said child safety seat having an engagement point;
      a splitter plate having a first end configured for engaging and retaining said engagement point of said two shoulder harness straps and a second end opposite said first end; and
      a lower harness strap having a first end engaged with said second end of said splitter plate and a second end that is adjustable affixed to said child safety seat; and
   an energy absorbing including:
      a length of webbing material having a first end and a second end;
      a central core between said first and second ends having a relaxed length and an extended length, said central core being adapted to elongate from said relaxed length to said extended length under a force applied to said energy absorbing region and to absorb said force;
      a sheath having a first end and a second end received about said central core, said sheath having a length that is longer than said relaxed length of said central core, said sheath gathered about said central core and affixed to said first and second ends of said energy absorbing region, said sheath limiting the extended length of said central core; and
      a second splitter plate on a first end of said energy absorbing region and a loop on a second end thereof, said second splitter plate configured for engaging and retaining said engagement point of said two shoulder harness straps said loop being engaged by said first splitter plate in said restraint harness.

2. The restraint harness of claim 1, said central core being formed using a material selected from the group consisting of: rubber, elongatable textiles, elongatable plastic, elongatable metal and springs.

3. The restraint harness of claim 1, said central core being formed from partially oriented yarn fibers.

* * * * *